(12) United States Patent
Vaneecke et al.

(10) Patent No.: US 9,931,766 B2
(45) Date of Patent: Apr. 3, 2018

(54) SAWING BEADS AND METHOD FOR MAKING THE SAME

(71) Applicant: NV BEKAERT SA, Zwevegem (BE)

(72) Inventors: Jan Vaneecke, Gits (BE); Tom Baekelandt, Zwijnaarde (BE); Roland Groenen, Horebeke (BE)

(73) Assignee: NV BEKAERT SA, Zwevegem (BE)

( * ) Notice: Subject to any disclaimer, the term of this patent is extended or adjusted under 35 U.S.C. 154(b) by 43 days.

(21) Appl. No.: 14/782,520

(22) PCT Filed: Apr. 2, 2014

(86) PCT No.: PCT/EP2014/056572
§ 371 (c)(1),
(2) Date: Oct. 5, 2015

(87) PCT Pub. No.: WO2014/166786
PCT Pub. Date: Oct. 16, 2014

(65) Prior Publication Data
US 2016/0039115 A1    Feb. 11, 2016

(30) Foreign Application Priority Data
Apr. 10, 2013   (EP) .................................... 13163022

(51) Int. Cl.
*B28D 1/12*    (2006.01)
*B23D 61/18*    (2006.01)
*B23D 65/00*    (2006.01)

(52) U.S. Cl.
CPC ............. *B28D 1/124* (2013.01); *B23D 61/18* (2013.01); *B23D 61/185* (2013.01); *B23D 65/00* (2013.01)

(58) Field of Classification Search
CPC ....... B28D 1/124; B23D 61/185; B23D 65/00
USPC ....... 125/21, 22, 16.01, 16.02; 451/296, 168
See application file for complete search history.

(56) References Cited

U.S. PATENT DOCUMENTS

| 2,679,839 | A | | 6/1954 | Metzger | |
|---|---|---|---|---|---|
| 3,598,101 | A | * | 8/1971 | Hensley | ............... B23D 61/185 125/21 |
| 4,016,857 | A | | 4/1977 | Hall | |
| 6,146,476 | A | * | 11/2000 | Boyer | ..................... B23B 51/00 148/525 |
| 8,807,126 | B2 | * | 8/2014 | Baekelandt | .......... B23D 61/185 125/21 |

(Continued)

FOREIGN PATENT DOCUMENTS

| WO | WO 99/46077 A2 | 9/1999 |
|---|---|---|
| WO | WO 02/06553 A2 | 1/2002 |

(Continued)

*Primary Examiner* — Robert Rose
(74) *Attorney, Agent, or Firm* — Foley & Lardner LLP (57) ABSTRACT

A method to make sawing beads by means of laser cladding is disclosed whereby metal matrix powder is molten by means of a laser beam on a rotating sleeve while diamonds are thrown in the molten metal pool. By carefully controlling the temperature of the molten metal pool at or above 1150° C. for less than 200 ms the internal graphitization of the diamonds can be limited. Although some of the diamonds in the sawing bead show internal graphitization it is demonstrated by the inventors that a sawing cord using the bead obtained by the method has an above standard sawing performance.

14 Claims, 4 Drawing Sheets

(56) References Cited

U.S. PATENT DOCUMENTS

2003/0084894 A1   5/2003   Sung
2004/0107648 A1   6/2004   Sung
2004/0194689 A1   10/2004  Sung
2005/0136667 A1   6/2005   Sung
2008/0131620 A1   6/2008   Stiles

FOREIGN PATENT DOCUMENTS

WO   WO 2011/061166 A1   5/2011
WO   WO 2012/119946 A1   9/2012
WO   WO 2012/119947 A1   9/2012
WO   WO 2014/082870 A1   6/2014

\* cited by examiner

SAWING BEADS AND METHOD FOR MAKING THE SAME

TECHNICAL FIELD

The invention relates to the manufacturing of a sawing bead for use on a sawing cord for sawing natural or artificial stones or materials. Further the invention relates to the sawing bead thus obtained and the sawing cord equipped with such beads.

BACKGROUND ART

Sawing cords are increasingly used to saw blocks of stone into slabs for architectural or home interior use. The types of material sawn have steadily increased from the softer metamorphic stones such as marble to the extremely hard igneous rocks like granite (in all its shades of hardness and origin). In a saw machine using a sawing cord the cord is tensioned between at least two pulleys of which at least one is driven while the cord is pushed through a stone. 'Sawing wire' or 'saw wire' is many times used as an alternative term for 'sawing cord' but in this application the latter is preferred as it discriminates the product from other saw tools that are based on a single filament. A cord is known to be multi-filamentary.

While initially single loops of sawing cord were used to extract blocks out of quarries currently multi-loop slabbing machines have been designed driving up to 80 individual loops. Such loops are from 15 to 30 meters long and carry between 35 to 40 beads per meter so there are between 525 to 1200 beads per loop. Currently these beads are made via a powder metallurgy route (already described in U.S. Pat. No. 2,679,839 filed in 1952).

In this process an annular abrasive element is made from diamond grit that is thoroughly mixed with metal powder and an optional organic wax for forming a paste. The mixture of metal powder normally contains high melting temperature components such as cobalt, tungsten, iron, nickel sometimes in combination with low melting temperature components such as copper, tin, silver to improve consolidation. Possibly elements or compounds such as tungsten, phosphorous or tungsten carbide can be added to influence hardness and wear of the bead. The mixture is brought in a mould. This preform is sintered into a high density bead by application of temperature and possibly pressure (by ram pressing in the mould or by applying isostatic pressure through immersion in a high pressurised fluid). Suitable gasses are applied in order to prevent the powder from oxidising during sintering.

Producers will keep the combination of time and temperature below certain limits to prevent damage to the diamond particles. Diamond tends to graphitise (turn into graphite) when exposed to temperature above about 700° C. in air and above 1200° C. in an inert gas or vacuum. This graphitization starts from the outside of the diamond and results in a blackened, non-transparent diamond.

The resulting metallography of the sintered metal powder shows an amalgam of globular regions held together with low melting alloys.

After sintering the annular abrasive element is mounted on a metallic sleeve by means of a braze thus forming a sawing bead. In case of hot isostatic pressing annular abrasive elements are directly bonded to the sleeve and no brazing is needed. The beads are threaded on a steel cord and subsequently polymer is injection moulded in between the beads to keep them in position and to protect the steel cord from the environment.

Sawing cords have standardised around two sizes:
For quarrying and heavy duty work beads with an initial outer diameter of 9 to 11 mm are used. The steel cord has a diameter of 4.95 mm. The sleeves are 11 mm long and have an outer diameter of 7 mm.
For slabbing machines an initial outer bead size of 7.2 mm is standard. The steel cord has a diameter of 3.5~3.6 mm. The outer diameter of the sleeve is 5.0 mm and is 11 mm long. The current benchmark for slabbing is that at least 10 square meter of material can be cut per meter of sawing cord on a Class A type of granite.

There is a trend towards even smaller sizes: outer diameters of beads of 3.0, or even of 2.5 mm are being considered. Smaller bead sizes lead to more slabs out of a block per cut as less material is lost. Another trend is to have more but shorter beads per meter of sawing cord. More beads leads to better force distribution over the cord, better evacuation of swarf and improved sawing cord life duration.

Recently, novel ways of producing beads are being explored by laser cladding. A first suggestion to make sawing beads by means of laser cladding was published in WO 2002/06553 A2. In there the generic idea of using a laser cladding gun to produce sawing beads is described, but the disclosure gives no instructions as to what materials to use and the finer details of the process and the bead properties obtained. Furthermore the abrasive layer is produced on a solid rod that further has to be turned and drilled in a lathe to obtain the final bead leading to increased cost and handling.

It turns out to be difficult to directly produce an abrasive layer on a tiny metal sleeve with a mass that does not go above 1 gram. In recent publications WO 2012/119946 and WO 2012/119947 the current inventors have endeavoured ways to overcome the heating problems associated with such deposition and found beneficial properties of the bead resulting therefrom. One of the major problems one encounters is the heat balance during the deposition of the abrasive layer on a sleeve with no heat sink. If the input of heat is too high, the sleeve melts and/or the diamonds are damaged. If the input is too low, the coating is porous and/or the process is not economical.

Generally laser cladding with diamond containing coatings is applied on substrates with a large heat sink: massive substrates such as pump rotors, turbine vanes, . . . weighing several kilos wherein excess heat is easily drained towards the interior of the substrate. For example in US 2008/0131620 a process is described for applying a wear resistant coating to an article of manufacture wherein the temperature is kept between 400° C. and 900° C. combined with rapid cooling of the process with the explicit goal to prevent decomposition of the diamond.

Contrary to a wear resistant coating, the abrasive layer of a sawing bead must abrade away at the same pace that diamonds are worn in the sawing process. If the matrix wears too fast, abrasive particles will be dislodged while not being used to the full leading to premature tool failure. Conversely, if the matrix is too wear resistant, abrasive particles will not protrude sufficient for sawing resulting in too slow sawing.

In the following, the improved processes for making sawing beads are revealed together with the properties of the sawing beads resulting therefrom and the sawing cord made therewith.

DISCLOSURE OF INVENTION

The primary object of the invention is to improve on the existing art in making sawing beads, more particularly laser cladded sawing beads wherein an optimum in laser cladding speed at low diamond degradation is pursued. It is therefore an object of the invention to define a process window wherein well performing beads can be made without compromising the economics of the process. Further sawing beads are defined that may show some diamond damage but not enough to affect performance negatively. Another object of the invention is to provide a sawing cord, comprising beads made by laser cladding that are as good or better in sawing performance as the beads obtained by the powder metallurgy route.

According a first aspect of the invention a method for producing sawing beads is presented as per the features of claim 1. The sawing bead comprises a metal sleeve and an abrasive layer directly attached to the metal sleeve. The abrasive layer comprises diamond particles embedded in a metal matrix material. The method comprises the following steps:

providing a metal sleeve that is made to rotate axially;
providing a supply of metal matrix material in powder form carried in a gas flow;
providing a supply of diamond particles;
igniting an energy source in the form of a laser beam;

wherein the laser beam melts the powdery metal matrix material on the metal sleeve i.e. the metal matrix material powder temperature must be brought above its liquidus temperature. Thereby a molten metal pool is formed wherein the diamond particles are thrown.

Characteristic about the method is that the temperature of the molten metal pool is held at or above 1150° C. for less than 200 ms. This is to reduce, to lower or to limit internal graphitization of said diamond particles. The occurrence of internal graphitization is not prevented. The occurrence of some internal graphitization of the diamond even turns out to be beneficial for the sawing performance of the bead.

Additionally the temperature of 1150° C. of the molten metal pool should be reached for at least some time for example for 10 ms or even 20 ms to reach full consolidation of the abrasive layer and to form an alloy layer between the abrasive layer and the metal sleeve.

The temperature of the molten metal pool can even reach temperatures of 1200° C. for less than 100 ms but more than 5 or even 10 ms.

In the limit, the temperature of the molten metal pool may reach temperatures of 1250° C. for less than 50 ms but more than 5 ms.

Above 1300° C. the internal graphitization of the diamond occurs instantaneously and the diamonds degrade too much.

As a metal sleeve any kind of metallic, short tube that fits around the steel cord can be used. Given the size of the finished bead, the dimensions of the sleeve are minute: the wall thickness is smaller than 1 mm and the length is shorter than 11 mm, with an outer diameter that is less than 7 mm. The sleeve has a mass of less than 1 gram. The material used for the sleeve has a solidus temperature above or equal to the liquidus temperature of the metal matrix material as otherwise the sleeve would start to melt when the metal matrix material is deposited.

The solidus temperature is that temperature at which a metal or metal alloy becomes completely solid when cooled from the melt in thermal equilibrium. The liquidus temperature is that temperature at which a metal or metal alloy becomes completely liquid when heated from the solid in thermal equilibrium.

Preferred types of sleeves are steel based for their strength and temperature resistance. A preferred composition is as a steel comprising up to 0.8 wt % of carbon, less than 0.5 wt % of silicon, and one or more of metals out of the group comprising nickel, manganese, molybdenum, chromium, copper the balance being iron.

Possibly the sleeves can be made as two halves welded together around the steel cord as proposed in WO 2011/061166 A1 of the current applicant (more in particular paragraphs [0016] to [0018]).

Particularly preferred are sleeves made by metal injection molding as described in the application PCT/EP2013/073905 of the current applicant. Such a process allows a large degree of freedom to shape the inner part of the sleeve. In addition such a sleeve shows a favorable surface roughness for easy coupling of the laser light into the sleeve material.

Preferred compositions for metal injection moulding of metal sleeves are:
  Iron nickel steel (less than 0.2 wt % C; 1.9 to 8.0 wt % Ni; the balance being iron),
  stainless steels such as austenitic 316L (C≤0.03 wt %; 16 to 18% wt Cr; 10-14 wt % Ni; Mn≤2%; 2-3 wt % Mo; Si≤1 wt %; the balance being iron),
  Precipitation hardenable steels 17-4PH (C≤0.07 wt %; 15-17.5 wt % Cr; 3-5 wt % Ni; 3-5 wt % Cu; 0.15-0.45 wt % Nb; Mn≤1 wt %, Si≤1 15 wt %; the balance being iron).
  304L (C≤0.08 wt %; 18-20 wt % Cr; 8-10.5 wt % Ni; the remainder being iron).

There are many known alloys of metal matrix materials that are suitable for laser cladding. Given the constraints imposed by the abrasive particles alloys with liquidus temperatures between 400° C. and 1100° C. are more preferred. These alloys comprise silver, copper, nickel or cobalt as main alloy element. Additionally, melting temperature reducing elements such as tin, zinc, or even indium can be added. In the case of nickel non-metals like phosphorous, silicon or boron can be used to reduce the liquidus temperature.

Particularly preferred are brazes (copper and zinc as main elements) and bronzes (copper and tin as main elements) the latter being most preferred. Other preferred alloys are nickel based such as Ni—Cr—P, Ni—Cr—Fe—Si—B, or Ni—Cr—Si—Mn. These alloys give a good balance between abrasive use and matrix wear. If the matrix wears too fast, abrasive particles will be dislodged while not being used to the full leading to premature tool wear. Conversely, if the matrix is too wear resistant, abrasive particles will not protrude sufficient for cutting resulting in too low sawing speeds.

Most preferred are alloys that contain an additional active metal such as chromium, titanium, vanadium, tungsten, zirconium, niobium, molybdenum, tantalum, hafnium or combinations thereof. More preferred are chromium, zirconium, vanadium or titanium of which the latter is most preferred as it has the lowest melting point. These metals are active in two ways:
  They are known to improve the wetting of abrasive particles during deposition and;
  It are carbide formers that work well in combination with carbon containing abrasives.

When no active metal is present in the metal matrix material the abrasive particles will not wet easily to the molten metal. This even leads to 'bouncing back' of the abrasive particles on the meniscus of the molten metal pool when they are impinging the metal pool.

Most preferred bronzes contain between 5 and 30 wt % Sn, between 0.5 and 15 wt % Ti, the remainder being copper. Best results were obtained with bronzes having between 10 and 20 wt % Sn and between 2 and 10 wt % Ti, the remainder being copper. An example is an alloy containing 13% Sn, 9% Ti the remainder being copper, all expressed in weight percentage of the total. Such an alloy is completely molten (liquidus) at about 972 to 974° C.

A further observation is that the enthalpy of fusion per unit mass i.e. the amount of heat needed to melt one gram of a metal powder from completely solid to all liquid depends on the size of the powder particles: the smaller the size of the particles, the less energy is needed to melt them. Metal powder with particles with a size of less than 100 µm, even better with a size of less than 75 or lower than 50 µm or 20 µm are therefore preferred.

The lower limit is set by the flowability of the powder that depends on the specific powder properties such as morphology, humidity, size and other properties. Too fine powders are difficult to feed at a constant rate in a gas flow. Therefore metal matrix powder should not have a size less than 5 µm. As a carrier gas preferably a non-oxidising gas or inert gas such as argon is used.

Possibly filler materials can be added to the metal matrix material to fine tune the wear of the metal matrix material. Popular filler materials are hard ceramics such as tungsten carbide, silicon carbide, aluminium oxide and zirconium oxide. Addition of the aforementioned fillers will result in a more wear resistant metal matrix material and allows to synchronise the wear of the abrasive particles with that of the metal matrix material.

The abrasive particles considered for the purpose of this application are diamond particles. Diamond particles are easily wetted by all active metals mentioned. Diamond (i.e. almost pure carbon) particles are either manmade or of natural origin. Manmade diamonds are cost effective but are known to resist less well to higher temperature: they will start to degrade externally—i.e. a black coating forms—at temperatures above about 700° C. when in air atmosphere and to graphitize—i.e. to turn from diamond ($sp^3$ bonding) into graphite ($sp^2$ bonding)—above about 1150° C. when in vacuum or under inert atmosphere. Natural diamonds can sustain higher temperatures up to about 1300° C. in vacuum or under inert atmosphere without graphitizing. However, natural diamond grit is expensive and therefore excluded for making sawing beads according the invention.

In general particles with a size between 100 µm and 600 µm can be used in the method. More preferred is between 200 to 600 µm or from 300 to 500 µm. Particles for stone cutting are preferably large grit i.e. with wide range grit sizes US Mesh size 30/40, Mesh size 40/50 or Mesh size 50/60 (Mesh sizes are according to US Standard ASTME 11, the higher the numbers, the smaller the particles). Most preferred for sawing beads is mesh size 40/50. A 40 mesh sieve has square openings of 420 µm side where through smaller sized particles will pass. Part of those smaller particles will be held by the 50 mesh sieve with square openings of 297 µm side. The mean size of the remaining particles is about 427 µm in the grit size designation system according FEPA (Federation of European Producers of Abrasives) that assigns a mean size for every mesh size.

Typically between 20 and 100 mg of diamond particles are present per bead. In most applications between 30 and 70 mg or even between 30 and 50 mg of diamond particles will suffice.

Manmade diamonds of this size are generally made by High Pressure High Temperature (HPHT) synthesis where a mixture of graphite and a catalyst metal (optionally with small diamond seeds) are pressed in a ceramic canister above 4.9 GPa and held at a temperature above 1300° C. At this temperature and pressure graphite dissolves into the metal and the carbon recrystallizes as diamond. The catalyst contains metals like Fe, Ni, Co or Mn and remnants of those metals are found at the core of the grown crystal. The size and shape of the diamond particles can be modulated by adjusting grain grow rates that on themselves depend on pressure and temperature. High growth rates will lead to small diamonds.

The size of the diamonds is particularly important in that it is an observation of the inventors that larger sized diamonds—larger than 100 µm—are more vulnerable to internal graphitization than smaller sized diamonds. With internal graphitization is meant that the catalyst remnant at the core of the diamond will promote the reverse reaction of diamonds towards graphite (from $sp^3$ to $sp^2$). This as opposed to external graphitization where the formation of graphite starts from the outside inward. Such internal graphitization is visible on the diamond particle by the formation of a small black dot at the center of the otherwise clear grain.

The vulnerability for internal graphitization is therefore also determined by the amount of catalyst remaining: the more catalyst remains, the more vulnerable the diamond is for internal graphitization. The amount of catalyst can be determined by XRFS on the diamond grit itself or by ICP after ashing of the grits or by means of determining the mass magnetic susceptibility of the diamond. Particular limits are that:

In case of measurement by XRF or ICP: the mass sum of Fe, Ni, Co, Mn, and Cr is less than 20 mg, or preferably less than 10 mg or even less than 7 mg per gram of diamond or;

In case of measurement of the mass magnetic susceptibility the susceptibility should be lower than $300 \cdot 10^{-8}$ m$^3$/kg, preferably less than $150 \cdot 10^{-8}$ m$^3$/kg or even below $100 \cdot 10^{-8}$ m$^3$/kg.

Diamonds with a too high catalyst content will show internal graphitization at lower temperature.

The supply of diamond particles may follow the same feed channel as the supply of metal matrix material. Alternatively the supply of diamonds may follows a separate supply channel possibly supported by means of a gas flow or alternatively by strewing. The supply sequence of diamonds is preferably separately controllable from the supply of metal matrix material. In this way initially metal matrix material can be supplied without diamonds while diamonds can be fed once the molten metal pool has formed.

The energy source for melting the matrix material is a high intensity laser capable of delivering beams of at least 100 W, 1 kW or more of continuous or pulsed power, by preference emitting in the infra-red region of the spectrum. Particularly suited are Nd:YAG (neodymium doped yttrium-aluminium garnet) lasers pumped by flash lamps or solid state lasers or CO$_2$ gas lasers. The laser-light is guided through suitable wave guides and optics to have a focal point that can be adjusted in the vicinity of the substrate surface.

Independing of the metal matrix materials involved, the temperature of the molten metal pool must at least be held above the liquidus temperature of the metal matrix material. Although laser deposition is possible below the liquidus temperature of the metal matrix material the resulting cladding is not satisfactory as it does not reach full consolidation.

Once the metal is completely molten, the temperature can rise further in principle up to the evaporation temperature of the molten metal. It is therefore preferred that the molten metal pool is held at a temperature above the liquidus temperature $T_L$ of the metal matrix material, preferably above $T_L+50°$ C. or even above $T_L+100°$ C.

However, too high temperatures will damage the diamond particles, particularly if they are manmade, particularly if they are above about 100 µm, and particularly if they contain too high catalyst remains. It is a particular achievement of the inventors that they have demonstrated that a well performing sawing bead can be made with temperatures in the metal pool above the generally accepted harm limit of 1150° C. for large size (larger than 100 µm) diamonds.

As the temperature of the molten metal pool is to be within tight specifications it is a preferred embodiment of the invention that the temperature of the molten metal pool is controlled by adjusting the laser power impinging on the molten metal pool. By preference this is done by monitoring the surface area of the molten metal pool. The surface area of the molten metal pools is an indication for the heat balance at the molten metal pool:

$$P_{laser} = C \times \dot{m} + \dot{Q}$$

Wherein:

$P_{laser}$ is the laser power in watt injected into the molten metal pool; $\dot{m}$ is equal to the mass flow per minute (in grams per second) thrown into the molten metal pool. The supply of metal powder cools the metal pool;

$\dot{Q}$ is the total heat loss (in watt) to the environment: conductive losses to the sleeve, radiative losses to the surroundings, the heat loss due to the removal of the hot material from the laser spot (the sleeve turns), the heat absorbed by the diamond particles;

C is a variable (in joule per gram) that depends on the powder material: the heat it takes to bring the powder up to the melting temperature, the heat of fusion, and the additional increase in temperature before the material leaves the molten metal pool.

If the surface area of the metal pool grows during deposition this means that too much laser power is injected into the system. If the surface area of the molten metal pool decreases during deposition, too much heat is lost to the environment. The surface area of the molten metal pool is therefore an ideal measure for the heat balance in the deposition and a measure for the change in temperature during deposition.

In a first preferred embodiment the laser power is adjusted according a fixed profile. For example at the start of the deposition, the laser is ignited at maximum power to heat the metal sleeve and to form the initial molten metal pool. As soon as the pool is formed—which is within milliseconds—the power of the laser is reduced to keep the size of the molten metal pool constant.

In a further preferred embodiment the size of the molten metal pool is measured by means of high speed infrared camera of which the signal is converted to a temperature. This signal is used to steer the output power of the laser. With high speed is meant: more than 100 Hz, preferably above 200 Hz. If the sampling speed drops under 100 Hz the temperature is measured too late and the feedback to the laser is in delay with the true temperature at the laser spot. Due to that the laser may start to oscillate and the bead becomes of poor quality.

It is the experience of the inventors that the adjustment to the laser power is minimal when the sequence of laser illumination and powder feeding are well synchronised by positioning the laser spot relative to the powder feed in an optimal way. This is achieved by optically spreading the laser beam that irradiates the metal sleeve or already formed bead surface into a first substantially elongated area spot (e.g. ellipsoidal or rectangular) that spans about the axial length of the metal sleeve or already formed bead surface. The supply of metal matrix material arrives at the surface of the metal sleeve or already formed bead surface in a second substantially elongated area, also spanning about the length of the metal sleeve but having an area that is smaller than said first area. By preference the supply of metal matrix powder and diamonds is focused on the molten metal pool to prevent spill-over of the diamond particles.

The inventors have found that best efficiencies can be achieved when the axial centre line of the second elongated area is slightly offset with respect to the axial center line of said first elongated area, wherein the offset is in the direction of rotation of the metal sleeve or already formed bead. Hence the focus of the laser beam does not coincide with the focus of the matrix material supply. However, the second elongated area must remain within the first elongated area as otherwise this leads to a loss in coating efficiency.

The time interval wherein the molten metal pool reaches a temperature of or above 1150° C. can be set by selecting the relative speed between laser beam and the circumference of the bead. This relative circumferential speed is between 5 and 500 mm/s, more preferably between 10 to 250 mm/s or even better between 20 to 100 mm/s. Preferably this circumferential speed is kept constant during the complete formation of the bead.

Also important is that the molten metal pool is actively cooled down to below the solidus temperature of the molten metal material within a turn of the bead or even better within half a turn. If the metal pool is not sufficiently cooled within one turn of the bead the temperature will increase at each turn leading to thermal runaway. Cooling the metal sleeve and already formed bead surface can be done by means of a fluid flow (gas such as air or argon or liquid such as water) through the centre of the bead or by means of a solid (e.g. a rod carrying the metal sleeve or a steel cord) inserted through the center of the bead.

According a second aspect of the invention a sawing bead is presented. The sawing bead comprises a metal sleeve, an abrasive layer attached to the metal sleeve, wherein said abrasive layer comprised diamond particles. Characteristic about the sawing bead is that some of the diamonds show internal graphitization.

The diamond particles can be extracted out of the metal matrix by dissolving the metal of the matrix in a suitable acid (for example Aqua Regia, a mixture of nitric acid and hydrochloric acid). This procedure occurs at room temperature and does not affect the diamonds in any way.

In order to assess the presence of internal graphitization, a random sample of at least 100 diamonds extracted from the diamond bead is taken. With 'random sample' is meant that no pre-selection has taken place of the diamonds in terms of size, form weight, visual aspect or any other feature. Possibly all of the diamonds can be recuperated from the bead, but the complete analysis of all diamonds may be tedious and superfluous.

With 'internal graphitization' is—for the purpose of this application—meant that under a binocular single diamonds will show a distinguishing internal black spot at approximately the core in the otherwise transparent diamond. When the size of such spot is just visible but occupies less than about 10% of the diamond area in the field of viewing the diamond is marked as 'internal graphitization, light (IGL)'. When the spot is larger but the diamond remains transparent it is marked as 'internal graphitization, severe (IGS)'. When the diamond is no longer transparent and the surface is blackened it is marked as 'externally thermally degraded (BL)', but is not considered as 'internally graphitised' (because the interior is not visible). When the diamond remains transparent and does not show an internal spot it is marked as 'unaffected (UA)'.

Diamonds recovered from diamond beads obtained by the metallurgical powder route are either 'unaffected (UA)' or are completely covered with an active metal in which case it is not possible to discern internal graphitization (which would be catalogued as 'BL').

For the purpose of this application with 'some of the diamonds' is meant at least 2 of the at least one hundred in the random sample. In most cases at least 5 of the one hundred or more in the random sample will show 'internal graphitization'.

The deposition of the abrasive layer is preferably by laser cladding. Even more preferred is if the abrasive layer is de posited according any one of the methods described in the process claims.

More preferred is if some but not more than 60% of the diamond particles in the random sample show internal graphitization. Even more preferred is if some but not more than 40% of the diamonds in the sample show internal graphitization. In certain cases—high diamond quality, smaller sized diamonds, perfect temperature control—the number of diamonds showing internal graphitization will be less than 20%.

However, it is particularly preferred that the number of diamonds with 'external thermal degradation' is kept to a minimum for example less than 10% of the diamonds in the random sample, or even less than 5%.

Quite surprisingly to the inventors, a sawing bead can have a fraction of internally graphitised diamonds without seriously affecting performance. This goes against the general belief in the field that diamond damage should be avoided at all cost. Indeed the presence of internal graphitization may make the diamond particle somewhat more vulnerable to crushing, but crushing is still preferred to diamonds being pulled out. The crushed diamonds still add to the wear resistance of the bead whereas pulled out diamonds do not longer saw. Of course this fraction cannot be too large as otherwise the sawing capability of the diamonds is seriously diminished.

According a third aspect of the invention a sawing cord is claimed. The sawing cord comprises a steel cord and sawing beads threaded thereon wherein the sawing beads are separated by a polymer sleeve. The polymer sleeve is injection moulded between the beads. The beads are made by a laser cladding process, preferably a laser cladding process as claimed in the method claims. The sawing cord can cut at least 10 square meters of granite of class A per meter of sawing cord. This is the performance one nowadays expects from a sawing cord based on the powder metallurgical route. The inventors demonstrate in the examples following that 12 square meter of granite of class A can be sawn per meter of the inventive sawing cord.

MODE(S) FOR CARRYING OUT THE INVENTION

In a series of experiments laser cladded beads were made on mild steel cylindrical sleeves of length 11 mm, having an outer diameter of 5.00 mm and a wall thickness of 0.575 mm.

The following type of equipment was used:
Laser cladding system
 Diodelaser 'Laserline LDF 3 kW' operating at 1900 W in continuous mode at wavelengths of 808 and 940 µm.
 A lateral feed channel for feeding metal matrix powder and diamond, the diamond being separately controllable from the metal matrix powder flow;
Powder handling equipment:
 Sulzer Metco Twin powder hopper
 Gas supply: argon.
 Both metal matrix material and diamond particles were fed through the same argon gas flow.

As a metal matrix material powder obtained from Phoenix Scientific Industries Ltd. of composition Cu—Sn (13 wt %)—Ti (9 wt %) was used. Differential Scanning Calorimetric analysis revealed that solid-solid phase transitions start to occur at about 765° C. and that the powder completely turns into liquid (liquidus temperature) at 972° C. The powder was separated into three fractions: one with a size below 20 µm, one with size between 20 and 45 µm and one with size above 45 µm. The latent heat (from 765° to 972° C.) to bring the powders to melt differed: 40.5 J/g for fraction the fraction below 20 µm, 60.0 J/g for the fraction between 20-45 µm and 73.8 J/g for the fraction above 45 µm. The size of the metal powder has an effect on the cooling capacity of the powder: smaller particles have less cooling power than larger particle sizes.

The diamond particles used were sifted to mesh 40/50 with a median size of 415 µm. The sum of the masses of Fe, Ni, Co, Mn, and Cr as measured by XRFS was 6 mg per gram of diamond. Further tungsten carbide filler was added to the matrix material flow to increase the toughness of the abrasive layer.

The method to produce the sawing bead starts by rotating the sleeve at 200 rpm. This corresponds to a relative circumferential speed between sleeve and laser beam of 52.4 mm/s. This speed between bead and laser beam was kept constant during deposition. The laser is ignited and after a rotation the supply of metal matrix material in an argon flow is turned on (this can e.g. be performed by moving the supply channel onto the sleeve surface). Also the diamond particles and the tungsten carbide filler particles follow the same flow.

Figure 3:
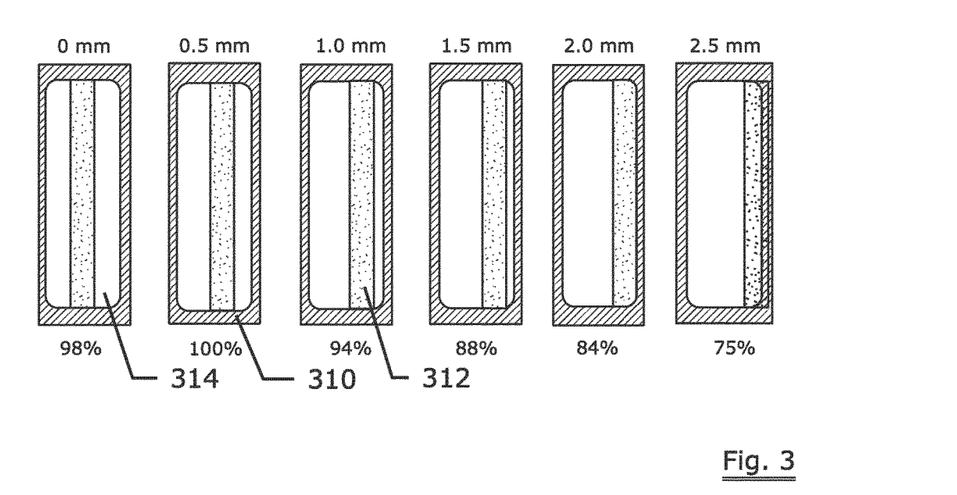
FIG. 3 illustrates the optimal relative position of the first and second elongated area on the metal sleeve.

The relative position of the laser spot and powder feed is explained in FIG. 3. The laser spot was broadened by suitable optics to an approximate rectangle of 8 mm in axial direction by 3 mm in circumferential direction of the sleeve 310: the first elongated area 314. The exposure time of the sleeve to the laser beam is 57.3 ms. The powder feeding was also over substantially the complete width of the sleeve 310 but was made very narrow: 8 mm in axial direction by 2 mm in circumferential direction: the second elongated area 312. The position wherein the long axis of the first and second elongated area coalesce is taken as the reference position ('0 mm').

A series of experiments showed that position +0.5 mm compared to the reference was best in terms of cladding efficiency (which is noted in percent below the figure: 100%). In this position the axial centre line of the second elongated area (powder feed) is offset from the axial centre line of the first elongated area (laser beam) in the direction of the turning of the sleeve. The offset ensures that the bead surface is optimally heated before powder is thrown on. The width of the molten metal pool that forms was about 1 to 2 mm corresponding to a time of about 20 to 40 ms. In the molten metal pool the temperature is uniform and maximal.

When the offset becomes too large (positions marked +1.0 mm, 1.5 mm, +2.0 mm and +2.5 mm) the bead surface is pre heated too much and not all the powder has time to melt in the melt pool resulting in decreased efficiencies (94, 88, 84 and 75% respectively). Likewise putting the powder feed in the middle of the laser spot i.e. the '0 mm' position also leads to loss of material: when the laser beam area is positioned symmetrical, no account is taken for the initial heating of the bead surface. This likewise results into less efficient material use (98%).

Figure 2:
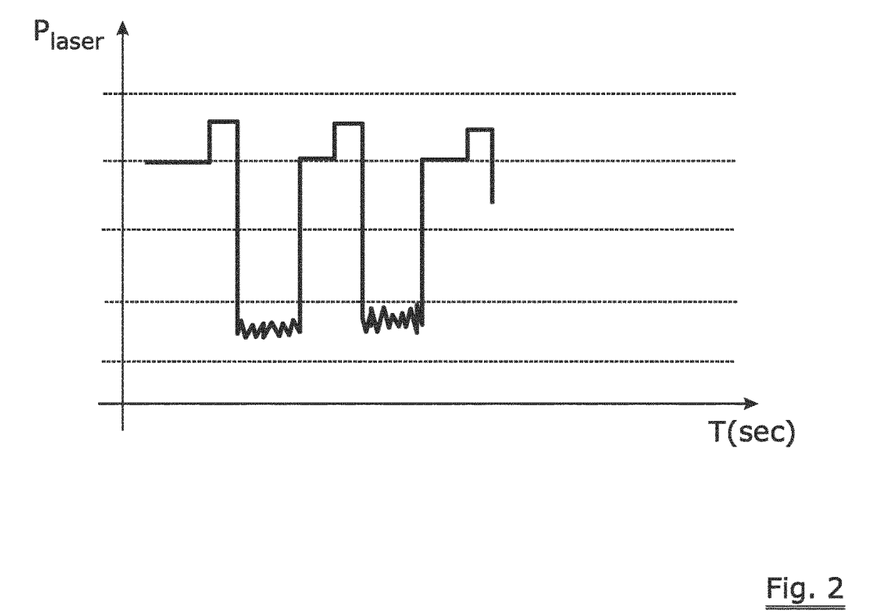
FIG. 2 describes a typical laser cycle for coating a metallic sleeve with an abrasive layer.

The size of the molten metal pool was monitored by an Emaqs camera operating at 220 Hz sampling frequency and converted into a temperature. Different test beads were made with a nominal temperature set to 1000° C. (25%), 1100° C. (29%), 1200° C. (32%), 1300° C. (33%), 1400° C. (35%) and 1500° C. The numbers between brackets refer to the laser output relative to nominal maximum power. Typically the laser output power follows a curve as shown in FIG. 2. The laser is kept at a high power between bead making. First a laser pulse is given to heat the sleeve and then the power is dropped and controlled via the size of the molten metal pool that is formed. There is a feedback loop from the Emaqs temperature sensor to the laser input controlling the laser power.

The matrix material of the beads was subsequently dissolved in Aqua Regia. The recovered diamonds were analysed under the binocular into 4 categories as exemplified in FIG. 1a to 1d.

Figure 1A:
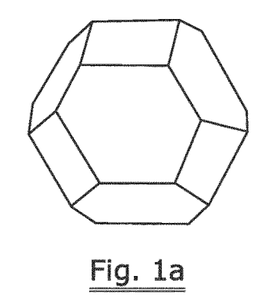
FIGS. 1a to 1d illustrate the phenomenon of internal graphitization and external thermal degradation.
Figure 1B:
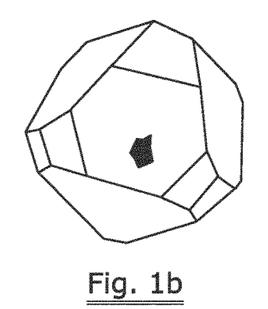
Figure 1C:
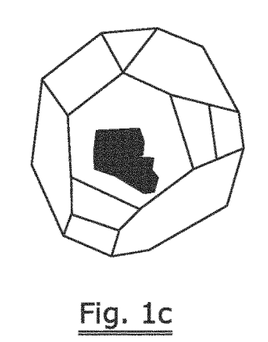
Figure 1D:
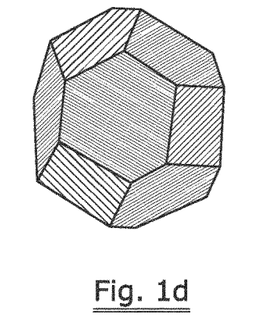
Figure 4:
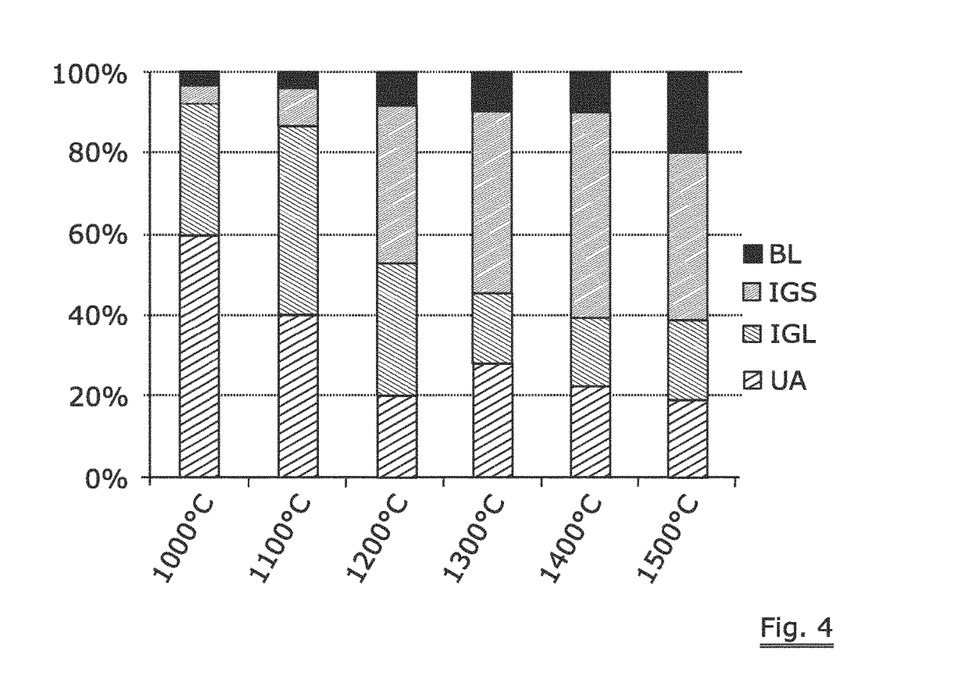
FIG. 4 demonstrates the effect of the molten metal pool temperature on the phenomenon of internal graphitization and external thermal degradation.

UA: unaffected as shown in FIG. 1a
IGL: internal graphitization, light as in FIG. 1b
IGS: internal graphitization, severe as in FIG. 1c
BL: external, thermal degradation as in FIG. 1d The results for the different set temperatures are illustrated in FIG. 4. The influence of the thermal graphitization is clear. Beads made at a temperature of 1500° C. or 1400° C. show more than 10% of externally, thermally degraded diamonds while only about 20% remain unharmed.

Beads made at 1200° C. and 1300° C. have less than 10% diamonds that show external thermal degradation, but about 60% of them show internal graphitization. The severe internal graphitization part diminishes with decreasing temperature. Below 1200° C. the internal graphitization is clearly reduced and more than 40% of the diamonds are unaffected and less than 4% show external thermal degradation. Of the 60% diamonds showing internal graphitization only a minority (less than 10%) show severe internal graphitization.

The influence of the graphitization was assessed by making two loops of sawing rope 17 meter long with 37 beads per meter. Beads were threaded on a steel cord of 7×7/3.5, the loop was closed by means of a splice and polyurethane was injection moulded between the beads.

A first loop marked 'Inv1' was made at a melt pool temperature of above about 1300° C. A second loop marked 'Inv2' was made with a melt pool temperature between 1150° C. to 1250° C. Both loops were tested on various granite qualities. During sawing the remaining diameter of the beads was measured as function of the number of square meter of stone sawn. At a bead diameter of about 6 mm the loops were taken from the single loop wire saw for further analysis. When extrapolating the measured wear behaviour to the 'end-of-life' diameter of 5.6 mm, the loop 'Inv1' would have been able to cut 7 m$^2$ per meter of sawing cord of class A granite. The extrapolated end-of-life of the second loop 'Inv2' was 12 m$^2$/m normalised to Class A material. In general 10 m$^2$/m is considered as an acceptable performance of a sawing cord.

Figure 5:
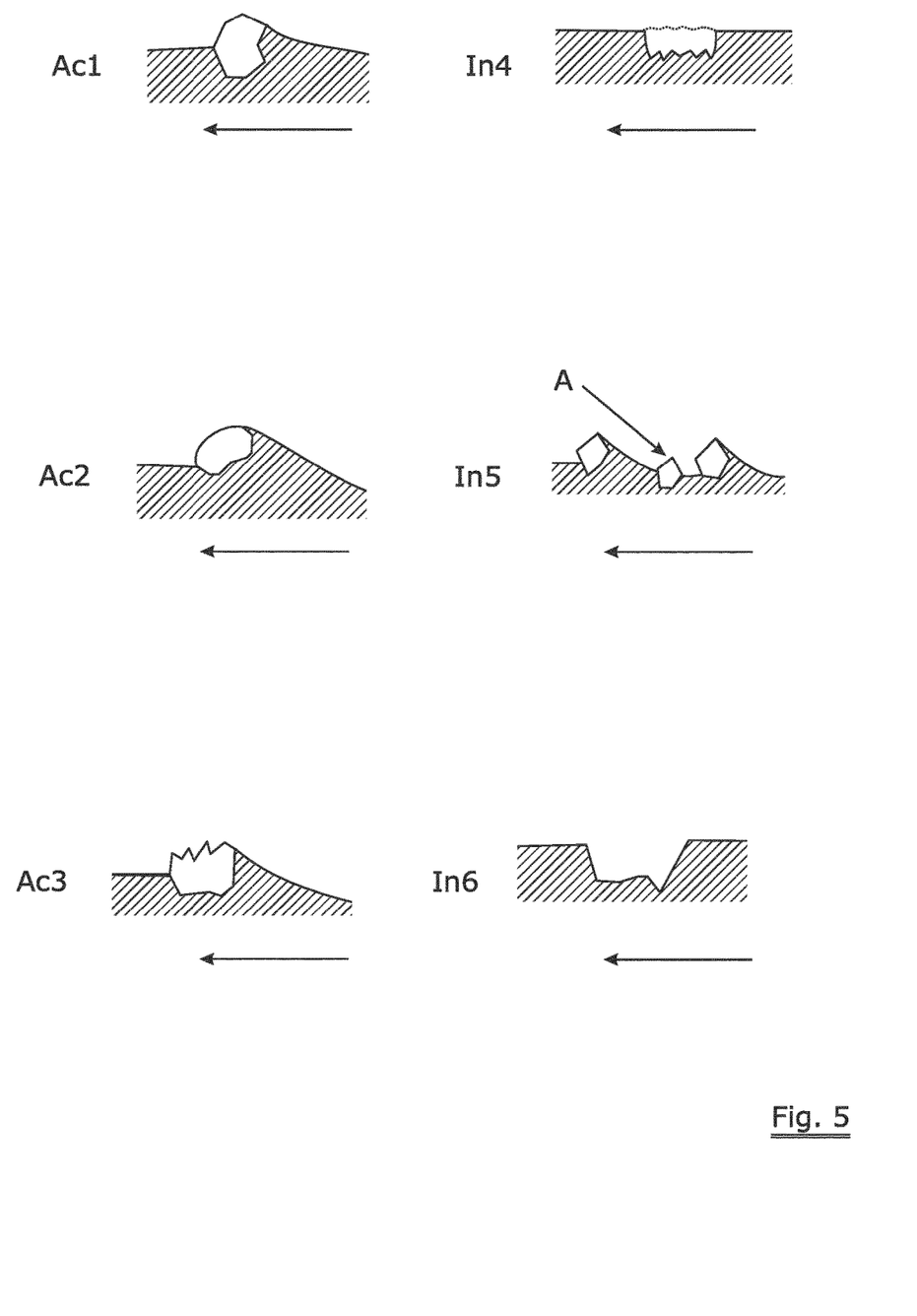
FIG. 5 classifies the different states a diamond particle may have during the use of the sawing bead.

The used beads of the first competitor rope 'Comp1' a second competitor rope 'Comp2' (also made according the powder metallurgy route) and the first and second ropes 'Inv1' and 'Inv2' were analysed under the binocular. A classification can be made between diamonds that are still able to cut i.e. 'active' diamonds and diamonds that are no longer able to cut or have not yet reached the cutting stage i.e. 'inactive' diamonds. The classification is shown in FIG. 5 (the arrow below the graphs indicates the direction of movement of the bead, the hatched region indicates the metal matrix holding the diamonds):

Ac1 is a sharp and protruding diamond that is actively cutting;
Ac2 is a diamond with a polished surface. It is still able to cut but to a lesser extent;
Ac3 is a diamond showing a fresh, fractured surface that can start cutting anew The inactive diamonds can be categorised as:

In4 is a crushed diamond that does not longer protrude from the matrix;
In5 are non-working diamonds either buried in the matrix, or shielded by neighbouring diamonds (indicated with 'A');
In6 shows the recess remaining after a diamond has been pulled out of position.

Figure 6:
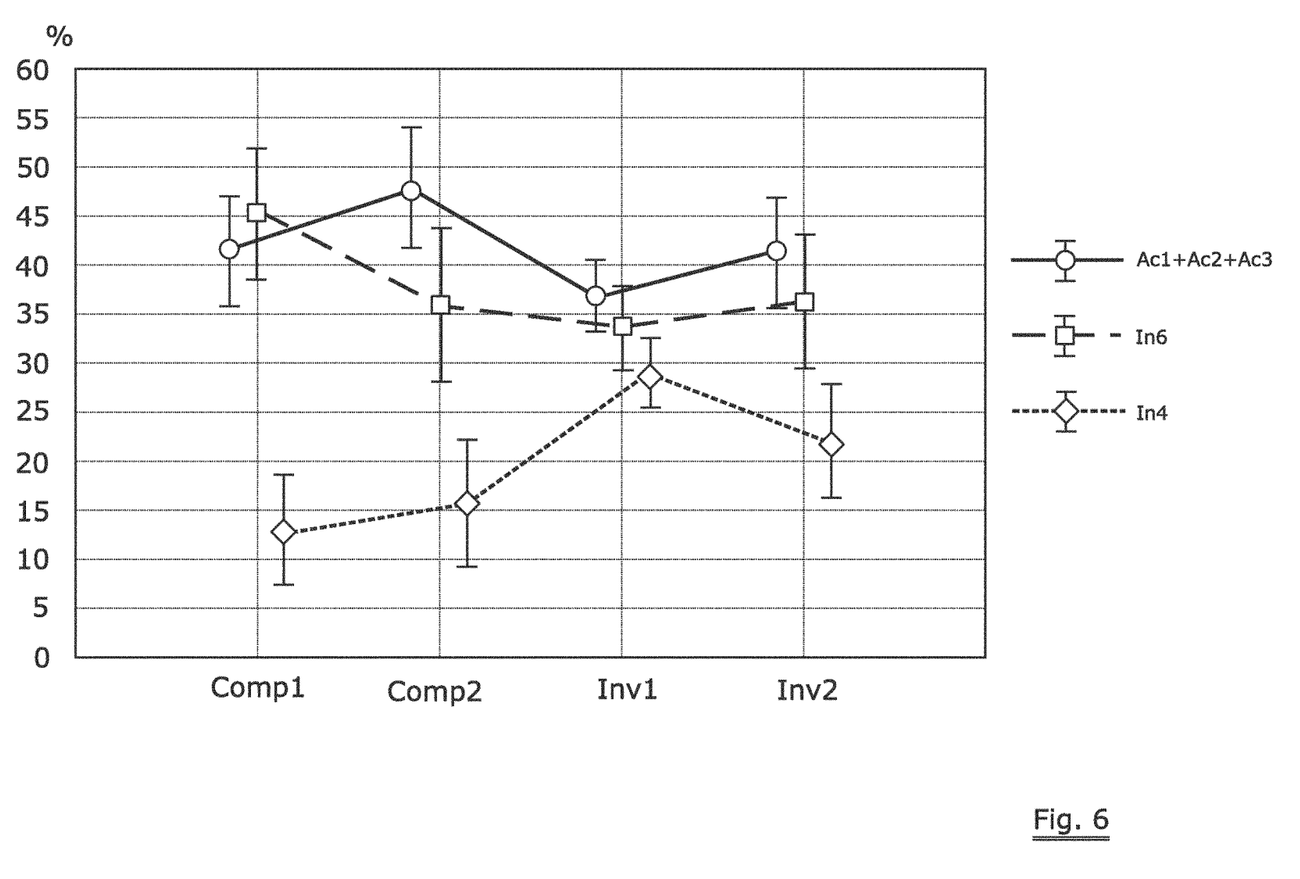
FIG. 6 illustrates the influence of the laser cladding conditions on the wear behaviour of the diamond particles in the sawing bead.

FIG. 6 shows the relative occurrence of the used diamond classes for the four sawing ropes. Comp1 was the best performing rope and mostly shows either pulled-out diamonds In6 (45%) and active diamonds (42%). There are about 13% crushed diamonds. Comp2 shows more active diamonds (47%), less pull-out (37%) but more crushed diamonds (16%). Inv1 shows a low level of active diamonds (38%) and pull-outs (34%) but a lot of crushed diamonds 28%. Compared to 'Comp1', 'Inv2' shows about the same percentage 42% of active diamonds, a lower level of pulled out diamonds (36%) but more crushed diamonds (22%). This indicates that the beads of 'Inv2' remain as active as those of 'Comp1' but that they will rather crush than being pulled out at their end of use.

These field trials illustrate that a limited number of internally graphitised diamonds in a laser cladded sawing bead does not affect the overall performance of the sawing cord.

The invention claimed is:

1. A method for producing a sawing bead, said sawing bead comprising an abrasive layer on a metal sleeve, said abrasive layer comprising diamond particles embedded in a metal matrix material, said method comprising the steps of:
   providing said metal sleeve that is made to rotate axially;
   providing a supply of metal matrix material in powder form carried in a gas flow;
   providing a supply of diamond particles;
   igniting an energy source in the form of a laser beam;
   wherein said laser beam melts said metal matrix material on said metal sleeve, thereby forming a molten metal pool wherein said diamond particles are thrown, and
   wherein the temperature of said molten metal pool is held at or above 1150° C. for less than 200 ms to limit internal graphitization of said diamond particles.

2. The method of claim 1, wherein said diamond particles have a mean size above 100 μm.

3. The method according to claim 1, wherein said laser beam irradiates a first elongated area of the surface of said metal sleeve, said first elongated area spanning substantially the axial length of said metal sleeve, and
   wherein said supply of metal matrix material arrives at the surface of said metal sleeve in a second elongated area spanning substantially the axial length of said metal sleeve, said second elongated area being smaller in area than said first elongated area, said first elongated area substantially covering said second elongated area.

4. The method according to claim 3, wherein the axial centre line of said second elongated area is offset with respect to the axial centre line of said first elongated area, said offset being in the direction of rotation of said metal sleeve.

5. The method according to claim 1, wherein the power of said laser beam is adjusted during the deposition of said abrasive layer by keeping the area of said molten metal pool substantially constant during deposition.

6. The method of claim 5, wherein said molten metal pool area is continuously monitored during the deposition of said abrasive layer and used as a feedback signal to steer the power of said laser beam.

7. The method according to claim 1, wherein the molten metal pool is cooled to below the solidus temperature of said metal matrix material within one turn of said sleeve to prevent external thermal degradation of said diamond particle.

8. A sawing bead, comprising:
   a metal sleeve, and
   an abrasive layer attached to said metal sleeve, said abrasive layer comprising diamond particles,
   wherein some but not more than 60% of said diamond particles show internal graphitization.

9. The sawing bead according to claim 8, wherein said abrasive layer is deposited by laser cladding.

10. A sawing bead comprising a metal sleeve, an abrasive layer attached to said metal sleeve, said abrasive layer comprising diamond particles embedded in a metal matrix material, wherein some of the diamond particles show internal graphitization, and wherein said abrasive layer is deposited by a method of laser cladding, comprising the steps of:
    providing said metal sleeve that is made to rotate axially;
    providing a supply of metal matrix material in powder form carried in a gas flow;
    providing a supply of diamond particles; and
    igniting an energy source in the form of a laser beam;
    wherein said laser beam melts said metal matrix material on said metal sleeve, thereby forming a molten metal pool wherein said diamond particles are thrown; and
    wherein the temperature of said molten metal pool is held at or above 1150° C. for less than 200 ms to limit internal graphitization of said diamond particles.

11. The sawing bead according to claim 8, wherein some but not more than 40% of the diamond particles show internal graphitization.

12. The sawing bead according to claim 11, wherein less than 10% of the diamonds show external thermal degradation.

13. A sawing cord comprising a steel cord and sawing beads threaded thereon wherein the sawing beads are separated by a polymer sleeve, said sawing beads comprising an abrasive layer on a metal sleeve, said abrasive layer comprising diamond particles embedded in a metal matrix material, wherein said sawing beads are made according to a method comprising the steps of:
    providing said metal sleeve that is made to rotate axially;
    providing a supply of metal matrix material in powder form carried in a gas flow;
    providing a supply of diamond particles; and
    igniting an energy source in the form of a laser beam;
    wherein said laser beam melts said metal matrix material on said metal sleeve, thereby forming a molten metal pool wherein said diamond particles are thrown, and
    wherein the temperature of said molten metal pool is held at or above 1150° C. for less than 200 ms to limit internal graphitization of said diamond particles.

14. A sawing cord, comprising:
    a steel cord and sawing beads threaded thereon,
    wherein the sawing beads are separated by a polymer sleeve, and
    wherein said sawing beads comprise a plurality of sawing beads according to claim 8.

* * * * *